US011965633B2

(12) United States Patent
Park et al.

(10) Patent No.: US 11,965,633 B2
(45) Date of Patent: Apr. 23, 2024

(54) ILLUMINATION DEVICE FOR MOTOR VEHICLE HEADLIGHT

(71) Applicant: ZKW Group GmbH, Wieselburg (AT)

(72) Inventors: Taeyang Park, Incheon (KR); Alexander Schager, Scheibs (AT); Bernhard Mandl, Vienna (AT); Kyriakos Kosmas, Hofamt Priel (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/234,564

(22) Filed: Aug. 16, 2023

(65) Prior Publication Data

US 2024/0060616 A1 Feb. 22, 2024

(30) Foreign Application Priority Data

Aug. 17, 2022 (EP) .................................... 22190799

(51) Int. Cl.

*F21S 41/43* (2018.01)
*F21S 41/143* (2018.01)
*F21S 41/25* (2018.01)
*F21W 102/135* (2018.01)

(52) U.S. Cl.

CPC ............. *F21S 41/43* (2018.01); *F21S 41/143* (2018.01); *F21S 41/25* (2018.01); *F21W 2102/135* (2018.01)

(58) Field of Classification Search

CPC .......................... F21S 41/43; F21W 2102/135
See application file for complete search history.

(56) References Cited

U.S. PATENT DOCUMENTS

2008/0239741 A1 10/2008 Nakada et al.
2008/0239742 A1 10/2008 Nakada et al.
2010/0309678 A1* 12/2010 Yamagata ............ F21S 41/148 362/539
2010/0309679 A1* 12/2010 Yamagata ............ F21S 41/148 362/547

(Continued)

FOREIGN PATENT DOCUMENTS

CN 207350141 U 5/2018

OTHER PUBLICATIONS

Extended European Search Report for European Patent Application No. 22190799.1, dated Jan. 26, 2023 (5 Pages).

*Primary Examiner* — Eric T Eide
(74) *Attorney, Agent, or Firm* — Eversheds Sutherland (US) LLP

(57) ABSTRACT

Illumination device for a motor vehicle headlight for producing a dipped beam distribution, which has a homogeneous light distribution in the region below the intersection HV up to at least −3° along the vertical line V-V. The illumination device includes: (i) an illuminant for emitting light, (ii) a screen with a screen edge, wherein the screen includes a first and a second screen section, which are connected by a connecting section, and (iii) a projection optics system, which is designed to project the dipped beam distribution towards a main emission direction. The connecting section has a deflection surface, which extends along a plane with a spatial vector, which forms a first angle of 1° to 3°, preferably of 2°, to the first axis, and forms a second angle of 1° to 3°, preferably of 2°, to the main emission direction.

10 Claims, 3 Drawing Sheets

(56) References Cited

U.S. PATENT DOCUMENTS

| | | | | |
|---|---|---|---|---|
| 2013/0051054 | A1* | 2/2013 | Yamagata | F21S 41/43 362/518 |
| 2016/0186954 | A1* | 6/2016 | Han | F21S 41/365 362/509 |
| 2017/0241609 | A1 | 8/2017 | Luo et al. | |
| 2018/0224085 | A1 | 8/2018 | Luo et al. | |

* cited by examiner

ILLUMINATION DEVICE FOR MOTOR VEHICLE HEADLIGHT

CROSS-REFERENCE TO RELATED APPLICATIONS

This application claims priority to European Patent Application No. 22190799.1, filed Aug. 17, 2022, which is incorporated herein by reference.

FIELD OF THE INVENTION AND DESCRIPTION OF PRIOR ART

The invention relates to an illumination device for a motor vehicle headlight for producing an asymmetrical dipped beam distribution, wherein the dipped beam distribution has a homogeneous light distribution in the region below the intersection HV of the horizontal line H-H and the vertical line V-V of an aiming screen for measuring a light distribution up to at least −3° along the vertical line V-V, wherein the illumination device comprises the following:

an illuminant for emitting light, a screen with a screen edge, wherein the screen is arranged in such a way that the screen edge cooperates to produce an asymmetrical dipped beam distribution, and wherein the screen comprises a first and a second screen section, wherein the second screen section is elevated relative to the first screen section (as seen in a correctly installed state of the illumination device in a motor vehicle), and wherein the first and the second screen section are connected to one another by a connecting section of the screen, a projection optics system, comprising an optical axis, which projection optics system is designed to project the dipped beam distribution produced by the screen in combination with the illuminant towards a main emission direction in front of the illumination device.

Furthermore, the invention relates to a motor vehicle headlight comprising at least one illumination device according to the invention.

Screens with a screen edge for producing a dipped beam distribution in illumination devices are usually designed in such a way that the upper side reflects and deflects light emitted by the illuminant.

In particular, the connecting section of the screen ensures that light is deflected in such a way that it is no longer directed onto the projection optics system and is therefore missing to create or form the dipped beam distribution.

Especially in the region below the cut-off line in the area surrounding the intersection HV, i.e. below the asymmetrical rise or at the start of the rise of the dipped beam distribution, there are therefore inhomogeneities, which leads to a shadow area below the intersection HV.

In this context, the term “homogeneous” means the lack of sudden changes between bright and dark areas in the light distribution.

SUMMARY OF THE INVENTION

It is an object of the invention to provide an improved illumination device.

This object is achieved by virtue of the fact that the connecting section of the screen has a deflection surface with an end edge, which end edge forms a section of the screen edge of the screen, wherein a first virtual axis is arranged orthogonally to the main emission direction, wherein the first virtual axis (as seen in a correctly installed state of the illumination device) is arranged in a horizontal plane, wherein the deflection surface extends along a plane, wherein the plane has a spatial vector, which spatial vector, as seen in the main emission direction, forms a first angle of 1° to 3°, preferably of 2°, to the first axis, and as seen along the first axis, forms a second angle of 1° to 3°, preferably of 2°, to the main emission direction in order to direct at least part of the light of the illuminant incident on the deflection surface towards the region below the intersection HV up to at least −3° along the vertical line V-V.

It can be provided that the longitudinal extension of the connecting section along the main emission direction is a third, preferably a quarter, of the focal length of the projection optics system.

All indications of value ranges in the present description should be understood as including any and all sub-ranges thereof, e.g. the indication 1 to 10 is to be understood as including all sub-ranges, starting from the lower limit 1 and the upper limit 10, i.e. all sub-ranges start with a lower limit of 1 or greater and end with an upper limit of 10 or less, e.g. 1 to 1.7, or 3.2 to 8.1, or 5.5 to 10.

“Main emission direction” means the direction in which the illuminant emits the most or the strongest light as a result of its directionality.

The main emission direction advantageously coincides with the optical axis of the projection optics system.

It can be provided that the screen edge has an asymmetrical edge, which contributes to the generation of the asymmetrical rise in the dipped beam distribution, wherein the end edge of the deflection surface forms the asymmetrical edge of the screen edge.

It can be provided that the first and the second screen section respectively extend substantially in a horizontal plane (as seen in a correctly installed state of the illumination device in a motor vehicle), wherein the first and the second screen section have an offset along a second virtual axis, wherein the second virtual axis is arranged orthogonally to the first virtual axis and the main emission direction.

It can be provided that the illuminant is formed from a plurality of light-emitting diodes.

It can be provided that the illuminant comprises one or more optical heads, preferably collimators for the parallelization of light beams.

It can be provided that the region of the homogeneous light distribution in the dipped beam distribution below the intersection HV extends along the horizontal line HH from at least −4° to at least +4°.

The object is also achieved by a motor vehicle headlight comprising at least one illumination device according to the invention.

BRIEF DESCRIPTION OF THE DRAWINGS

The invention is explained below in more detail based on exemplary drawings. In the drawings.

DETAILED DESCRIPTION OF EMBODIMENTS OF THE INVENTION

By way of introduction, it should be noted that in the various embodiments described, the same parts are provided with the same reference numbers or the same component designations, wherein the disclosures contained in the entire description can be applied mutatis mutandis to the same parts with the same reference numbers or the same component designations. In addition, the positional information chosen in the description, such as top, bottom, side, etc., refers to the directly described and depicted figure and, in the event of a change of position, this positional information is to be transferred mutatis mutandis to the new position.

Figure 1:
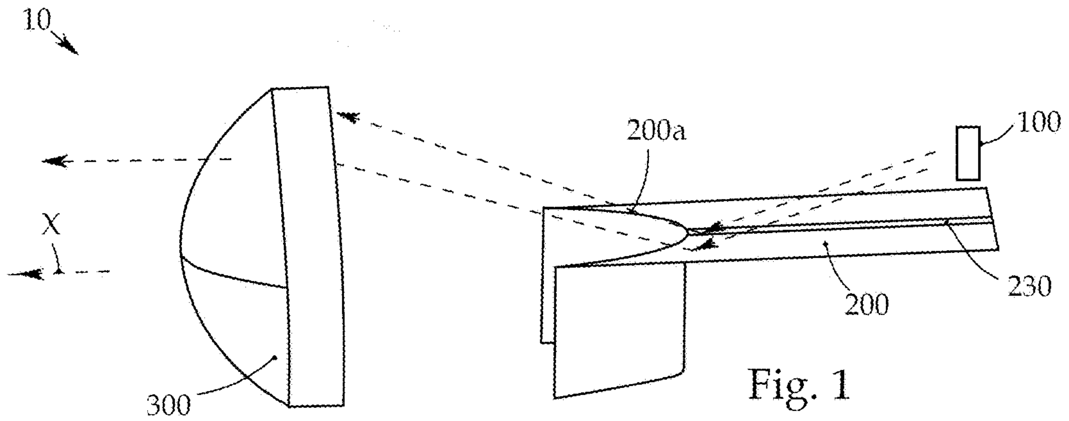
FIG. 1 shows a side view of an exemplary illumination device, comprising an illuminant, a screen and a projection optics system, wherein the illuminant produces a dipped beam distribution in combination with the screen, which distribution is projected by the projection optics system towards a main emission direction in front of the illumination device.

FIG. 1 shows an exemplary illumination device 10 for a motor vehicle headlight for producing an asymmetrical dipped beam distribution 50, wherein the dipped beam distribution 50 has a homogeneous light distribution in the region 51 below the intersection HV of the horizontal line H-H and the vertical line V-V of an aiming screen for measuring a light distribution up to at least −3° along the vertical line V-V.

The illumination device 10 comprises an illuminant 100 for emitting light, wherein in the example shown, the illuminant 100 is designed as a plurality of light-emitting diodes. Of course, the illuminant can also be designed differently. In particular, the illuminant 100 can have a plurality of light-emitting diodes arranged like a matrix next to and/or on top of each other. The light-emitting diodes can preferably be controlled individually such that they can be switched on and off and/or dimmed individually. The light-emitting diodes are preferably controlled automatically (e.g. controlled by a control device).

Furthermore, the illumination device 10 comprises a screen 200 with a screen edge **200*a*, wherein the screen 200 is arranged in such a way that the screen edge 200*a* cooperates to produce an asymmetrical dipped beam distribution 50**.

Figure 2:
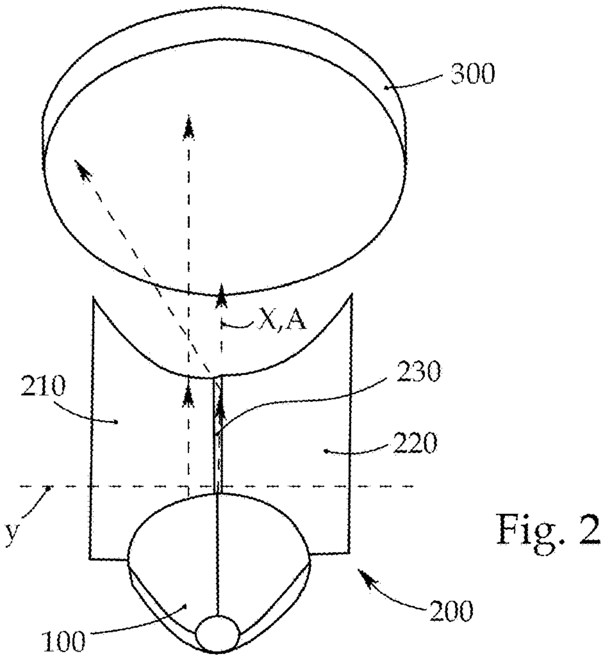
FIG. 2 shows the illumination device from FIG. 1 in a perspective, rear (illuminant-side along the main emission direction) view from above.

The screen 200 comprises a first and a second screen section 210, 220, which can be seen, inter alia, in FIG. 2. The second screen section 220 is elevated relative to the first screen section 210 (as seen in a correctly installed state of the illumination device in a motor vehicle), wherein the first and the second screen section 210, 220 are connected to one another by a connecting section 230 of the screen 200.

Furthermore, the illumination device 10 comprises a projection optics system 300, which is designed to project the dipped beam distribution 50 produced by the screen 200 in combination with the illuminant towards a main emission direction X in front of the illumination device 10. In the example shown, the projection optics system 300 is designed as a projection lens. The projection lens or projection optics system 300 projects an image of a dipped beam distribution produced inside the illumination device 10 in the region of a focal area (e.g. a focal plane) of the projection optics system 300 in front of the illumination device 10.

The screen 200 is rigid in design, wherein the screen edge **200*a* is arranged in the focal area of the projection optics system 300** (a focal plane or a focal point or a focal cloud or Petzval surface).

Figure 3:
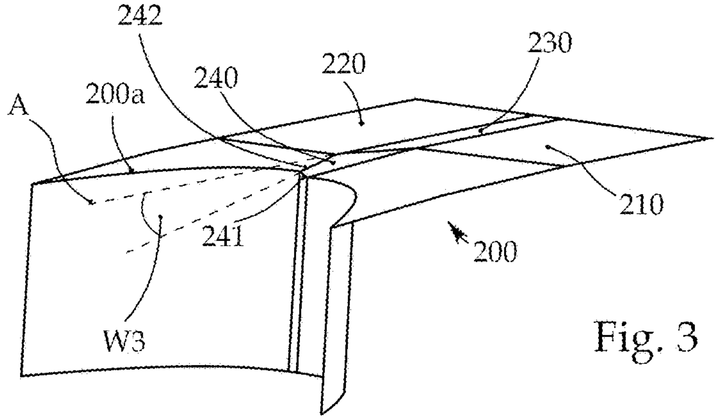
FIG. 3 shows a perspective view of the screen from the example from FIG. 1, wherein the screen has a screen edge, which contributes to the generation of the dipped beam distribution, wherein the screen has a first and a second screen section, which are connected to one another by a connecting section, and wherein the connecting section has a deflection surface, which is designed to deflect at least part of the light of the illuminant incident on the deflection surface onto the projection optics system.

FIG. 3 shows the screen 200 in a perspective view, wherein it can be seen that the connecting section 230 of the screen has a deflection surface 240 with an end edge 241, which end edge 241 forms a section of the screen edge **200*a* of the screen 200**.

As shown in the figures, in particular in FIG. 3, the screen edge **200*a* of the screen 200 has an asymmetrical edge, which contributes to the generation of the asymmetrical rise in the dipped beam distribution 50, wherein the end edge 241 of the deflection surface 240 forms this asymmetrical edge of the screen edge 200*a***.

The first and the second screen section 210, 220 respectively extend substantially in a horizontal plane (as seen in a correctly installed state of the illumination device in a motor vehicle), wherein the first and the second screen section 210, 220 have an offset along a second virtual axis z, wherein the second virtual axis z is arranged orthogonally to the first virtual axis y and the main emission direction X. The deflection surface 240 comprises a side edge 242, which delimits the second screen section 220 in sections and intersects the end edge 241, wherein the side edge 242 forms a third angle W3 with the optical axis A of the projection optics system 300 of 15° to 20°. The screen 200 lies in the optical axis A, wherein the projection optics system 300 is arranged in such a way that the optical axis A intersects the intersection HV of the aiming screen.

The left section or the first screen section 210 as seen in the main emission direction X is, as already explained, arranged slightly below a right section or the second screen section 220.

The connecting section 230 connects the two sections to one another such that, to some extent, there is a step or an oblique transition between the sections.

In the figures shown, the longitudinal extension of the connecting section 230 along the main emission direction is a third of the focal length of the projection optics system 300.

Thanks to the front edge of the left section or the edge of the first screen section 210, when a dipped beam distribution is generated after projection by the projection optics system 300, a raised section of the asymmetric cut-off is generated on the vehicle's own side of the road for right-hand traffic. Accordingly, the front edge or the edge of the second screen section 220 creates a lowered section of the asymmetric cut-off on the opposite side of the road.

Figure 4:
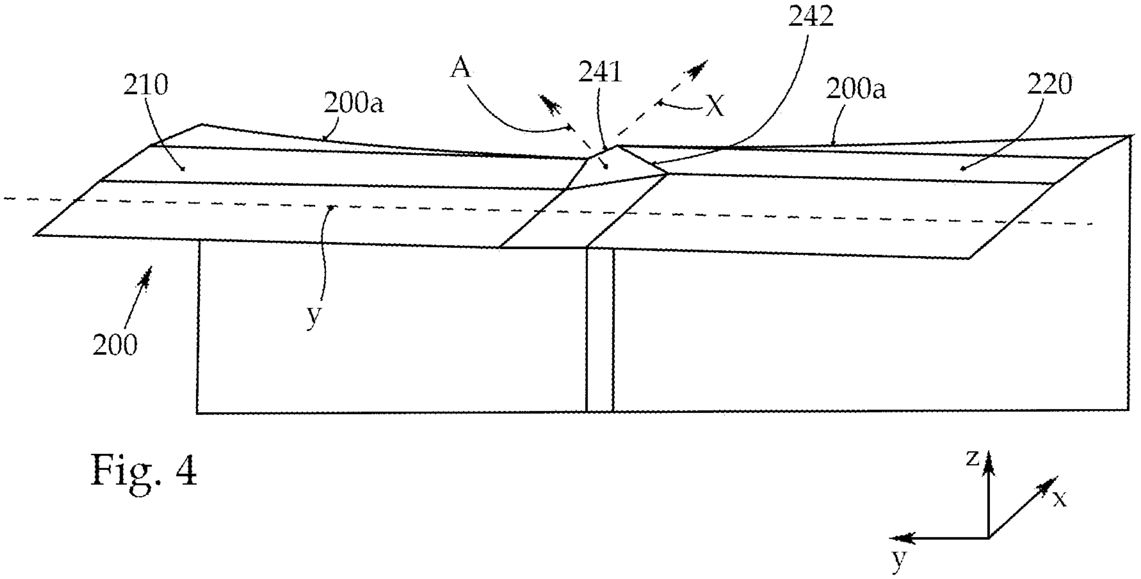
FIG. 4 shows a perspective view of the screen from FIG. 3 from behind, wherein the deflection surface extends along a plane, which has a spatial vector, which is respectively angled with respect to the main emission direction and with respect to a first virtual axis, which is orthogonal to the main emission direction and located in a horizontal plane.

A first virtual axis y is arranged orthogonally to the main emission direction X, wherein the first virtual axis y is arranged in a horizontal plane (as seen in a correctly installed state of the illumination device in a motor vehicle), as can be seen by way of example in FIG. 2 or FIG. 4.

Figure 5:
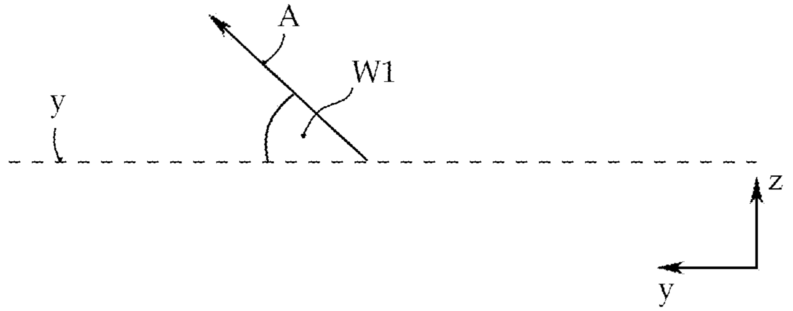
FIG. 5 shows the first angle formed by the spatial vector and the first virtual axis as seen in the main emission direction.

The deflection surface 240 extends along a flat plane, wherein the plane has a spatial vector A, as can be seen in FIG. 4. The spatial vector A forms a first angle W1 of 1° to 3°, preferably of 2°, to the first axis y as seen in the main emission direction X, as shown in FIG. 5.

Figure 6:
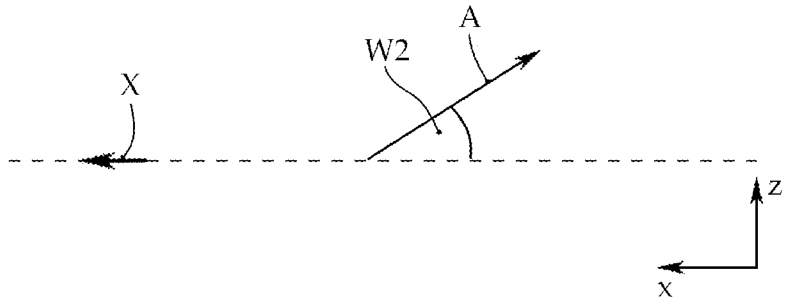
FIG. 6 shows the second angle formed by the spatial vector and the main emission direction as seen along the first virtual axis, wherein the main emission direction points left, i.e. starting from a right-handed Cartesian coordinate system (wherein the main emission direction corresponds to the x-axis) viewed against the y-axis or against the positive direction of the y-axis.

Furthermore, as seen along the first axis y, the spatial vector A forms a second angle W2 of 1° to 3°, preferably of 2°, to the main emission direction X in order to direct at least part of the light of the illuminant 100 incident on the deflection surface 240 towards the region 51 below the intersection HV up to at least −3° along the vertical line V-V. As shown in FIG. 6, the main emission direction X points left, i.e. starting from a right-handed Cartesian coordinate system (wherein the main emission direction X corresponds to the x-axis) is viewed against the y-axis or against the positive direction of the y-axis.

Figure 7:
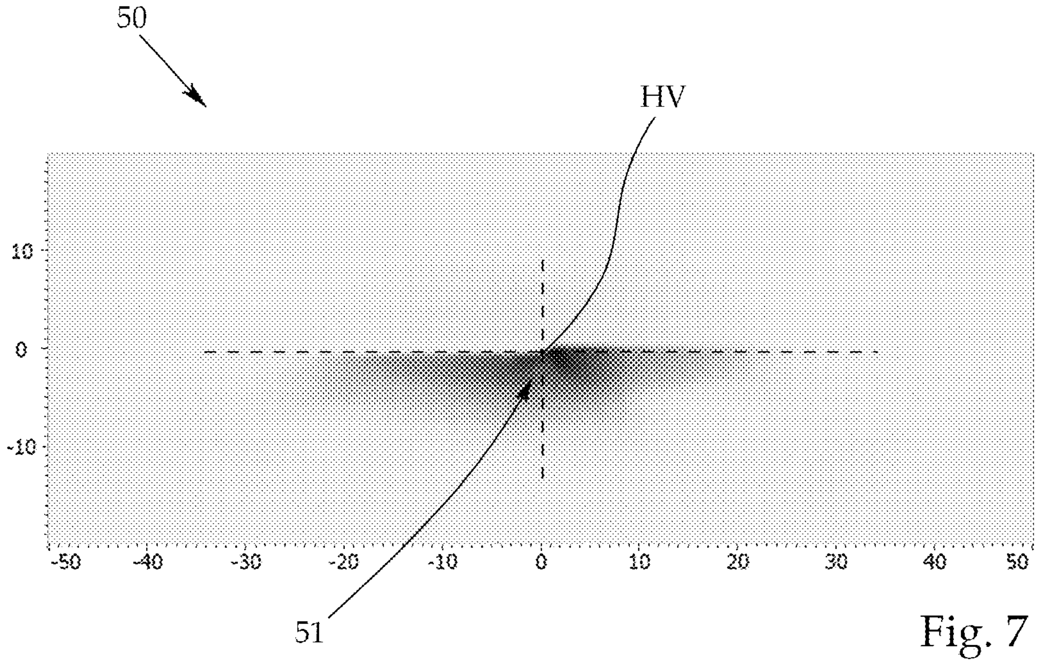
FIG. 7 shows a dipped beam distribution produced by an illumination device from the prior art, wherein the region below the intersection HV is inhomogeneous.

FIG. 7 shows a dipped beam distribution 50 produced by an illumination device from the prior art, wherein it shows that the region 51 below the intersection HV is inhomogeneous. The region 51 can extend in the dipped beam distribution 50 below the intersection HV along the horizontal line HH from at least −3° to at least +3°.

Figure 8:
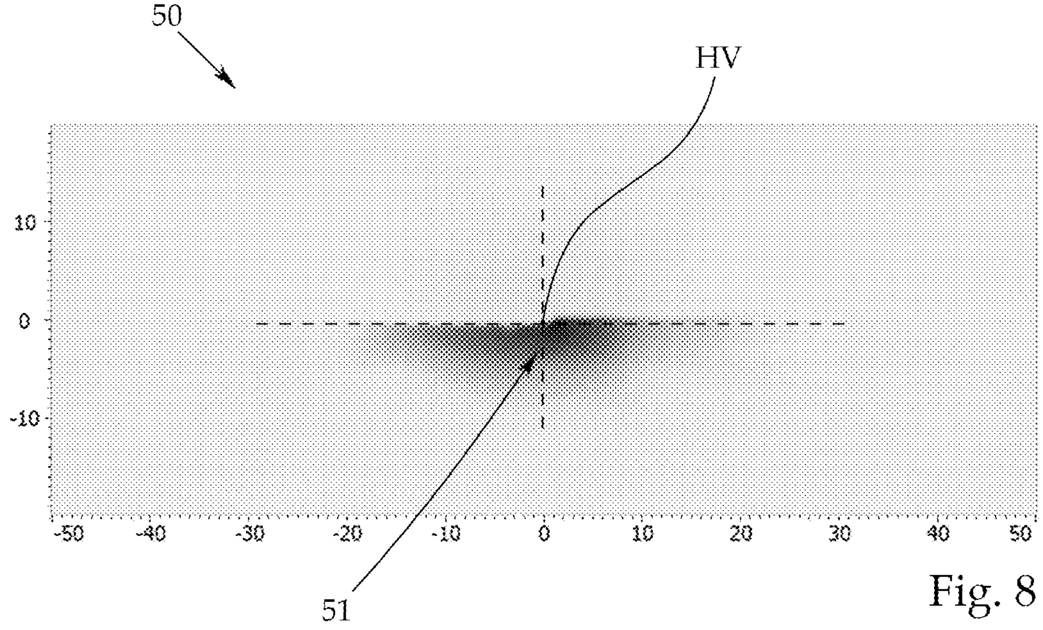
FIG. 8 shows a dipped beam distribution produced by an illumination device according to the invention, wherein the region below the intersection HV is homogeneous.

FIG. 8 shows a dipped beam distribution 50 produced by an illumination device 10 according to the invention, wherein it shows that the region 51 below the intersection HV is homogeneous compared to FIG. 7.

REFERENCE LIST

Illumination device . . . 10
Dipped beam distribution . . . 50
Region . . . 51
Illuminant . . . 100
Screen . . . 200
Screen edge . . . **200*a***
First screen section . . . 210
Second screen section . . . 220
Connecting section . . . 230
Deflection surface . . . 240
End edge . . . 241
Side edge . . . 242
Projection optics system . . . 300
Main emission direction . . . X
Virtual axis . . . y
Spatial vector . . . A
First angle . . . W1
Second angle . . . W2
Third angle . . . W3

The invention claimed is:

1. An illumination device (10) for a motor vehicle headlight for producing an asymmetrical dipped beam distribution (50), wherein the dipped beam distribution (50) has a homogeneous light distribution in the region (51) below the intersection HV of the horizontal line H-H and the vertical line V-V of an aiming screen for measuring a light distribution up to at least −3° along the vertical line V-V, the illumination device (10) comprising:

an illuminant (100) for emitting light;

a screen (200) with a screen edge (**200*a*), wherein the screen (200) is arranged in such a way that the screen edge (200*a*) cooperates to produce an asymmetrical dipped beam distribution (50), and wherein the screen (200) comprises a first and a second screen section (210, 220), wherein the second screen section (220) is elevated relative to the first screen section (210) as seen in a correctly installed state of the illumination device in a motor vehicle, and wherein the first and the second screen section (210, 220) are connected to one another by a connecting section (230) of the screen (200); and a projection optics system (300) comprising an optical axis (A), which projection optics system (300) is designed to project the dipped beam distribution (50) produced by the screen (200) in combination with the illuminant towards a main emission direction (X) in front of the illumination device (10), wherein the connecting section (230) of the screen has a deflection surface (240) with an end edge (241), which end edge (241) forms a section of the screen edge (200*a*) of the screen (200), wherein a first virtual axis (y) is arranged orthogonally to the main emission direction (X), wherein the first virtual axis (y) as seen in a correctly installed state of the illumination device is arranged in a horizontal plane, and wherein the deflection surface (240) extends along a plane, wherein the plane has a spatial vector (A), which spatial vector (A), as seen in the main emission direction (X), forms a first angle (W1**) of 1* to 3* to the first axis (y), and as seen along the first axis (y), forms a second angle (W2) of 1* to 3* to the main emission direction (X) in order to direct at least part of the light of the illuminant (100) incident on the deflection surface (240) towards the region (51) below the intersection HV up to at least −3* along the vertical line V-V.

2. The illumination device according to claim 1, wherein the spatial vector (A) forms a first angle (W1) of 2° to the first axis (y), and forms a second angle (W2) of 2° to the main emission direction (X).

3. The illumination device according to claim 1, wherein the screen edge (**200*a*) has an asymmetrical edge, which contributes to the generation of the asymmetrical rise in the dipped beam distribution (50), wherein the end edge (241) of the deflection surface (240) forms the asymmetrical edge of the screen edge (200*a***).

4. The illumination device according to claim 1, wherein the first and the second screen section (210, 220) respectively extend substantially in a horizontal plane as seen in a correctly installed state of the illumination device in a motor vehicle, wherein the first and the second screen section (210, 220) have an offset along a second virtual axis (z), wherein the second virtual axis (z) is arranged orthogonally to the first virtual axis (y) and the main emission direction (X).

5. The illumination device according to claim 1, wherein the deflection surface has a side edge (242), which delimits the second screen section (220) in sections and intersects the end edge (241), wherein the side edge (242) forms a third angle (W3) with the optical axis (A) of the projection optics system (300) of 15° to 20°.

6. The illumination device according to claim 1, wherein the longitudinal extension of the connecting section (230) along the main emission direction (X) is at least a third, preferably at least a quarter, of the focal length of the projection optics system (300).

7. The illumination device according to claim 1, wherein the illuminant (100) is formed from a plurality of light-emitting diodes.

8. The illumination device according to claim 1, wherein the illuminant (100) comprises one or more optical heads, preferably collimators for the parallelization of light beams.

9. The illumination device according to claim 1, wherein the region (51) of the homogeneous light distribution in the dipped beam distribution (50) below the intersection HV extends along the horizontal line HH from at least −4° to at least +4°.

10. A motor vehicle headlight comprising at least one illumination device (10) in accordance with claim 1.

* * * * *